United States Patent Office 2,735,305
Patented Feb. 21, 1956

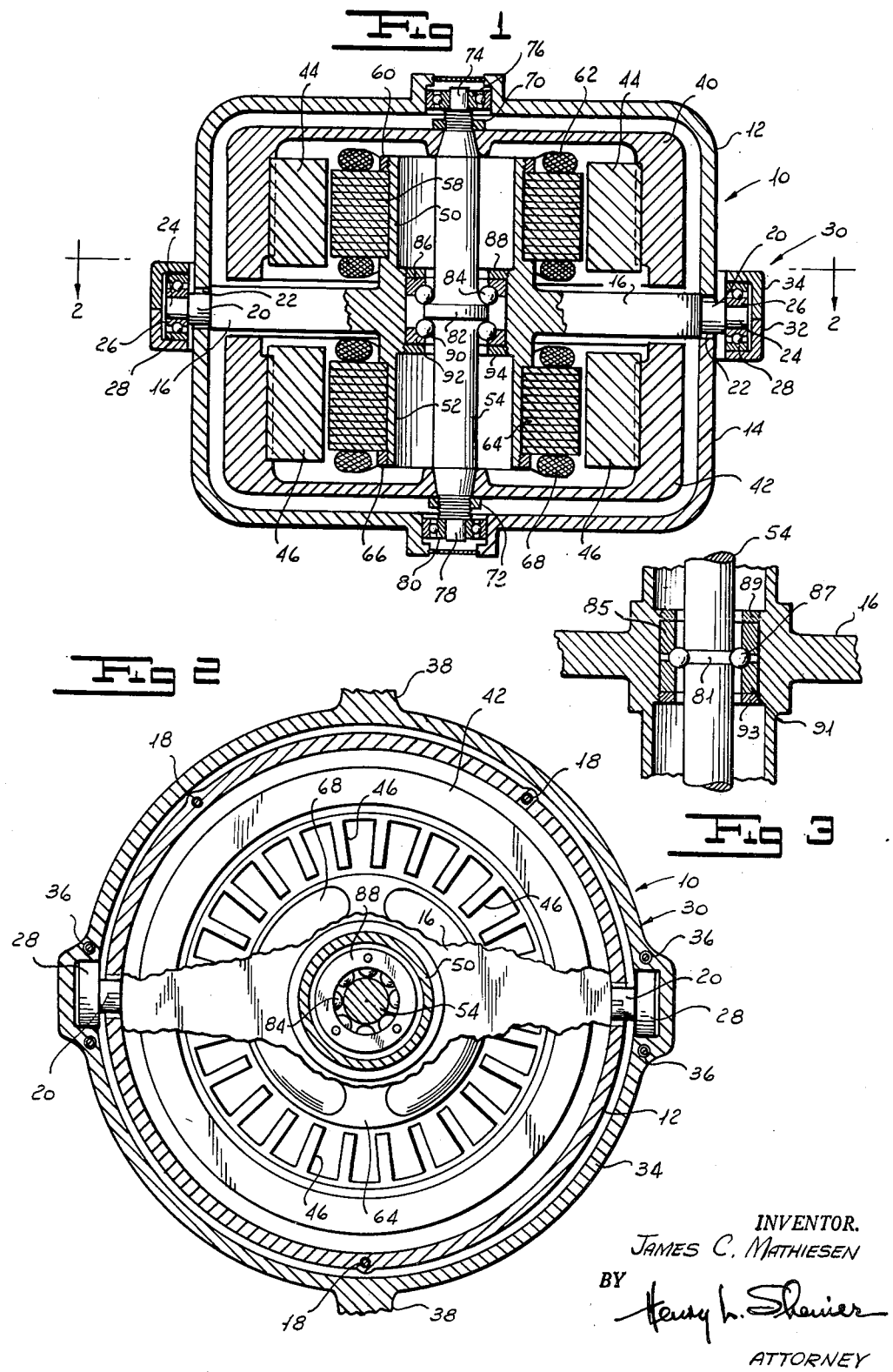

2,735,305

BALANCED GYROSCOPE

James C. Mathiesen, Pleasantville, N. Y., assignor, by mesne assignments, to Norden-Ketay Corporation, a corporation of Illinois Application June 3, 1952, Serial No. 291,448

4 Claims. (Cl. 74—5)

My invention relates to balanced gyroscopes, and more particularly to a gyroscope which will automatically compensate itself for unbalancing forces which would be normally introduced by reason of expansion and contraction of metal parts due to temperature changes.

This application is an improvement of my co-pending application Serial No. 272,389 filed February 19, 1952, now Patent No. 2,653,481, issued September 29, 1953.

Gyroscopes are frequently used for many control devices to furnish reference planes. For these purposes the gyroscope rotor must be carefully balanced to prevent precessional drifts from developing due to unbalance of the rotor with respect to the axes around which the gyroscope is free to pivot.

It has been found that if a gyroscope is balanced at one temperature, a change in temperature will frequently result in the production of unbalancing forces due to contraction and expansion inherent in the metal of which the rotor is made and the manner in which the rotor is mounted. Many attempts have been made by the art to eliminate this defect.

One object of my invention is to provide a gyroscope which will automatically compensate itself for the expansion and contraction of the rotor resulting from temperature changes.

Another object of my invention is to provide a gyroscope structure which when balanced at one temperature will remain in balance through a wide temperature range automatically compensating for expansion and contraction of metal parts.

Another object of my invention is to provide a gyroscope structure having a single shaft and employing a compound rotor which will automatically compensate itself for thermal expansion and contraction.

Other and further objects of my invention will appear from the following description.

In general, my invention contemplates the construction of a gyro rotor and stator each of two equal masses and mounting the rotor and stator symmetrically about a plane normal to the spin axis. The two rotor masses are mounted on a single shaft which is supported for rotation in three bearings. The shaft supported by the end bearings is free to move axially with respect to the bearings in expanding or contracting. The shaft is positioned in a third bearing intermediate the ends of the shaft and disposed symmttrically with respect thereto in a manner to prevent the center of the shaft from moving longitudinally of the rotor housing while being free to rotate around the axis of the rotor shaft. My construction is such that the expansion and contraction of parts will, due to the positioning of the central bearing, be equal and opposite about the plane in which the central bearing is positioned. Since this plane is symmetrical and at right angles to the spin axis, the gyroscope will always remain balanced.

In the accompanying drawings which form part of the instant specification and which are to be read in conjunction therewith and in which like reference numerals are used to indicate like parts in the various views:

Figure 1 is a sectional elevation of a gyroscope containing one embodiment of my invention.

Figure 2 is a sectional view taken along the line 2—2 of Figure 1 with parts broken away.

Figure 3 is an enlarged fragmentary sectional view of the central bearing showing a modified construction.

More particularly referring now to the drawings, a gyroscope housing indicated generally by the reference numeral 10 is formed by two identical cup-shaped members 12 and 14 and a central plate 16. The cup-shaped members are adapted to be clamped together by means of screws 18. The plate 16 is formed with a pair of trunnions 20 provided with splines 22 adapted to co-act with the housing members 12 and 14 to provide a rigid framework for supporting the gyro rotor. For purposes of convenience I will describe my gyroscope as one in which the spin axis is vertical, though it is to be understood that my invention is applicable to a gyroscope having a spin axis extending along any direction. The trunnions 20 are formed with reduced end portions 24 which are carried by the inner races 26 of a pair of ball bearings. The outer races 28 of the ball bearings are supported by a gimbal ring 30. The gyroscope housing, it will be observed, is pivoted along a horizontal plane normal to the spin axis. The axis of the trunnions 20 lies along the horizontal center line of the plate 16. The gimbal ring 30 is made with a lower part 32 and an upper symmetrical part 34 adapted to be clamped together by vertical screws 36, as can readily be seen by reference to Figure 2. The gimbal ring 30 is in turn formed with a pair of trunnions 38 lying in a horizontal plane but extending at right angles to the axis around which bearings 26 are positioned. These trunnions are mounted in suitable bearings carried by any desired support (not shown). The gyroscope rotor, therefore, is thus mounted with three degrees of freedom. The gyroscope rotor, per se, comprises an upper section 40 and a lower section 42, both of which are identical as nearly as they can be made. The rotor components may be formed of a heavy metal such as tungsten so that the rotor will have a high moment of inertia. The rotor 40 carries a plurality of blades 44 forming the squirrel cage of an induction motor. The lower rotor 42 carries a plurality of blades 46 likewise forming the squirrel cage of an induction motor. The central plate 16 is formed with an uper tubular portion 50 and a lower tubular portion 52 through which the rotor shaft 54 extends. Laminated core elements 58 are lodged around the upper tube 50 and clamped in position by a nut 60. The stator winding 62 is disposed about the core laminations 58. Similarly, core laminations 64 are disposed about the lower tube 52 and clamped in position by a nut 66. The winding 68 for the field of the lower rotor is disposed about the core laminations 64. Suitable three-phase alternating current is fed to the windings 62 and 68, as is well known to the art, to produce a rotating magnetic field which, coacting with the squirrel cage blades 44 and 46, drives the upper and lower rotors.

The upper rotor member 40 is secured to the shaft 54 by means of a nut 70. Similarly, the lower rotor body 42 is secured to the shaft 54 for rotation therewith by means of a nut 72. The upper end of shaft 54 is provided with a reduced end portion 74 positioned in a ball bearing 76 carried by the upper housing member 12. Similarly, the lower end of shaft 54 is provided with a reduced end portion 78 positioned in a bearing 80 carried by the lower housing member 14. The reduced end portion 78 is adapted to float axially, that is, it may move inwardly and outwardly of the bearing in response to temperature changes. If desired, the inner race of the bearing 76 may be snugly secured to the reduced end portion 74 and the outer race permitted to float. Similarly, the inner race of the bearing 80 may be snugly secured to the reduced end portion 78 and the bearing, per se, be permitted to float in the housing portion for axial movement.

The shaft 54 is provided with a flange 82 the upper portion of which is adapted to form a race for the bearing balls 84 which coact with an outer race ring 86. A plate 88 has threaded engagement with the plate 16 and holds the race ring 86 in contact with the bearing balls 84. Similarly, the lower side of the flange 82 is formed as a ball race upon which bearing balls 90 are seated and adapted to coact with an outer race ring 92 carried by the plate 16 and held in position by an externally threaded plate 94. A plane through the axis of the flange 82 is coextensive with the plane through the plate 16. In this manner the center of the shaft 54 intermediate its ends is positioned against axial movement and in the plane of the plate 16. When the rotor shaft 54 expands, both rotors will move away from the center but will remain in symmetrical position with one another. Similarly, if the shaft 54 contracts, both rotor masses will move toward the central flange 82 preserving a symmetrical or balanced relation. Similarly, any changes in dimensions of the rotors will be equal and opposite, thus preserving a balance.

In Figure 3, instead of a flange 82 I provide a groove 81 which forms the race for the bearing balls 87. An upper ring 85 and a lower ring 91 form the outer race coacting with the bearing balls 87. The shaft 54 is positioned axially of the housing by the externally threaded members 89 and 93 and thus provides a central lock bearing which, in connection with the floating end bearings, enables the automatic balancing to be achieved without the necessity of the spring loaded bearings shown in my copending application.

It will be seen that I have accomplished the objects of my invention. I have provided a balanced gyroscope which will remain balanced irrespective of temperature changes and in which the expansion and contraction of the gyroscope parts are automatically compensated for by maintaining a symmetrical arrangement. I have provided a central bearing of fixed position for the rotor shaft together with floating bearings for the ends of the shaft.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A gyroscope having a housing, a rotor mounted in the housing for rotation about a spin axis, means for mounting the housing for pivotal movement about a tilt axis extending at right angles to the spin axis, said rotor being formed with two symmetrical parts of equal mass, a shaft coaxial with the spin axis of the rotor, means for mounting said rotor parts upon said shaft for rotation therewith, a bearing support member carried by the housing symmetrical with a plane passing through the tilt axis at right angles to the spin axis, a central bearing for said shaft, means for mounting said bearing upon said bearing support member symmetrical with the plane thereof, coacting means carried by said shaft longitudinally central thereof and said bearing for positioning the center of the shaft against any axial movement with respect to the housing, a second bearing carried by the housing on one side of the plane, a third bearing carried by the housing on the other side of said plane symmetrical with the second bearing, said bearings being disposed coaxially with said shaft, means including the second bearing for floatingly supporting one end of the shaft and means including the third bearing for floatingly supporting the other end of the shaft.

2. A gyroscope having a compound rotor formed of two elements of equal mass disposed symmetrically about a plane extending at right angles to the spin axis, a unitary shaft for said compound rotor, means for securing the rotor elements to said shaft for rotation therewith, three coaxially positioned bearings for supporting said shaft, means for fixably mounting the central bearings of the three symmetrically about said plane, means including the other two bearings for floatingly supporting the shaft ends symmetrical with said plane and means carried by the shaft for coacting with the central bearing to prevent the center of the shaft longitudinally thereof from being axially displaced in either direction with respect to said plane.

3. A gyroscope as in claim 2 in which central bearing includes a pair of races and bearing balls, said coacting means comprising a flange formed centrally of said shaft, said races being disposed on opposite sides of said flange symmetrically therewith, said bearing balls being disposed between the flange and said races.

4. A gyroscope as in claim 2 in which said central bearing includes a pair of fixed races and bearing balls, said coacting means comprising a race groove carried by said shaft, said races being disposed of opposite sides of said race groove, said bearing balls contacting said fixed races and said shaft race.

References Cited in the file of this patent

UNITED STATES PATENTS

| | | |
|---|---|---|
| 796,893 | Brennan | Aug. 8, 1905 |
| 1,058,786 | Newkirk | Apr. 15, 1913 |
| 1,495,769 | Brewerton | May 27, 1924 |
| 1,954,998 | Hoffman | Apr. 17, 1934 |

FOREIGN PATENTS

| | | |
|---|---|---|
| 547,798 | France | Oct. 3, 1922 |
| 207,103 | Germany | Feb. 18, 1909 |